US012576832B2

(12) United States Patent
Hwang et al.

(10) Patent No.: US 12,576,832 B2
(45) Date of Patent: Mar. 17, 2026

(54) STRAIGHT DRIVING DEVICE OF IN-WHEEL SYSTEM AND CONTROL METHOD USING THE SAME

(71) Applicant: HYUNDAI MOBIS CO., LTD., Seoul (KR)

(72) Inventors: Jun Ha Hwang, Seoul (KR); Byong Sung Kim, Seoul (KR); Jae Hyun Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 105 days.

(21) Appl. No.: 18/398,375

(22) Filed: Dec. 28, 2023

(65) Prior Publication Data

US 2024/0227780 A1     Jul. 11, 2024

(30) Foreign Application Priority Data

Jan. 11, 2023     (KR) ........................ 10-2023-0004159

(51) Int. Cl.
*B60W 30/02*          (2012.01)
*B60W 50/14*          (2020.01)
*G01M 17/02*          (2006.01)
(52) U.S. Cl.
CPC ............ *B60W 30/02* (2013.01); *B60W 50/14* (2013.01); *G01M 17/02* (2013.01); *B60W 2422/70* (2013.01); *B60W 2520/14* (2013.01)
(58) Field of Classification Search
None
See application file for complete search history.

(56) References Cited

U.S. PATENT DOCUMENTS

| | | | |
|---|---|---|---|
| 9,168,924 B2 | 10/2015 | Lee et al. | |
| 2013/0325283 A1* | 12/2013 | Rylander | B60W 40/114 |
| | | | 701/82 |
| 2016/0121902 A1* | 5/2016 | Huntzicker | B60W 40/068 |
| | | | 701/1 |

(Continued)

FOREIGN PATENT DOCUMENTS

| | | | | |
|---|---|---|---|---|
| CN | 111332302 A | 6/2020 | | |
| CN | 112985843 A | * 6/2021 | | G01P 3/00 |
| JP | 2014121940 A | * 7/2014 | | |

OTHER PUBLICATIONS

Office action issued on Jun. 11, 2024 for corresponding EP Patent Application No. 24150934.8.

*Primary Examiner* — Peter D Nolan
*Assistant Examiner* — Jacob Kent Besteman-Street
(74) *Attorney, Agent, or Firm* — Morgan, Lewis & Bockius LLP

(57)          ABSTRACT

A control method for straight driving of an in-wheel system includes: a) measuring a vehicle alignment; b) calculating a yaw rate based on a vehicle misalignment level; c) determining whether the yaw rate calculated in the step b) is more than a predetermined allowable yaw rate; d) maintaining straight moving of the vehicle by using vectoring when the yaw rate calculated in the step b) is more than the predetermined allowable yaw rate; e) calculating an equivalent steering angle of each wheel based on the vehicle misalignment level and a deviation between left and right torques of motors that is acquired while the vectoring is performed; and f) determining whether each wheel is defective based on the equivalent steering angle.

14 Claims, 3 Drawing Sheets

(56)          References Cited

U.S. PATENT DOCUMENTS

| | | | |
|---|---|---|---|
| 2018/0023951 A1* | 1/2018 | Seo | B60W 30/12 |
| | | | 356/138 |
| 2018/0297634 A1* | 10/2018 | Kim | B62D 7/159 |
| 2019/0325670 A1* | 10/2019 | Tong | G07C 5/0825 |
| 2023/0018500 A1* | 1/2023 | Zhao | B60W 50/0225 |
| 2023/0166794 A1* | 6/2023 | Kim | G06T 7/60 |
| | | | 701/29.2 |
| 2023/0391397 A1* | 12/2023 | Kim | B62D 5/0481 |
| 2025/0130040 A1* | 4/2025 | Kim | G01B 21/26 |

* cited by examiner

[FIG. 1]
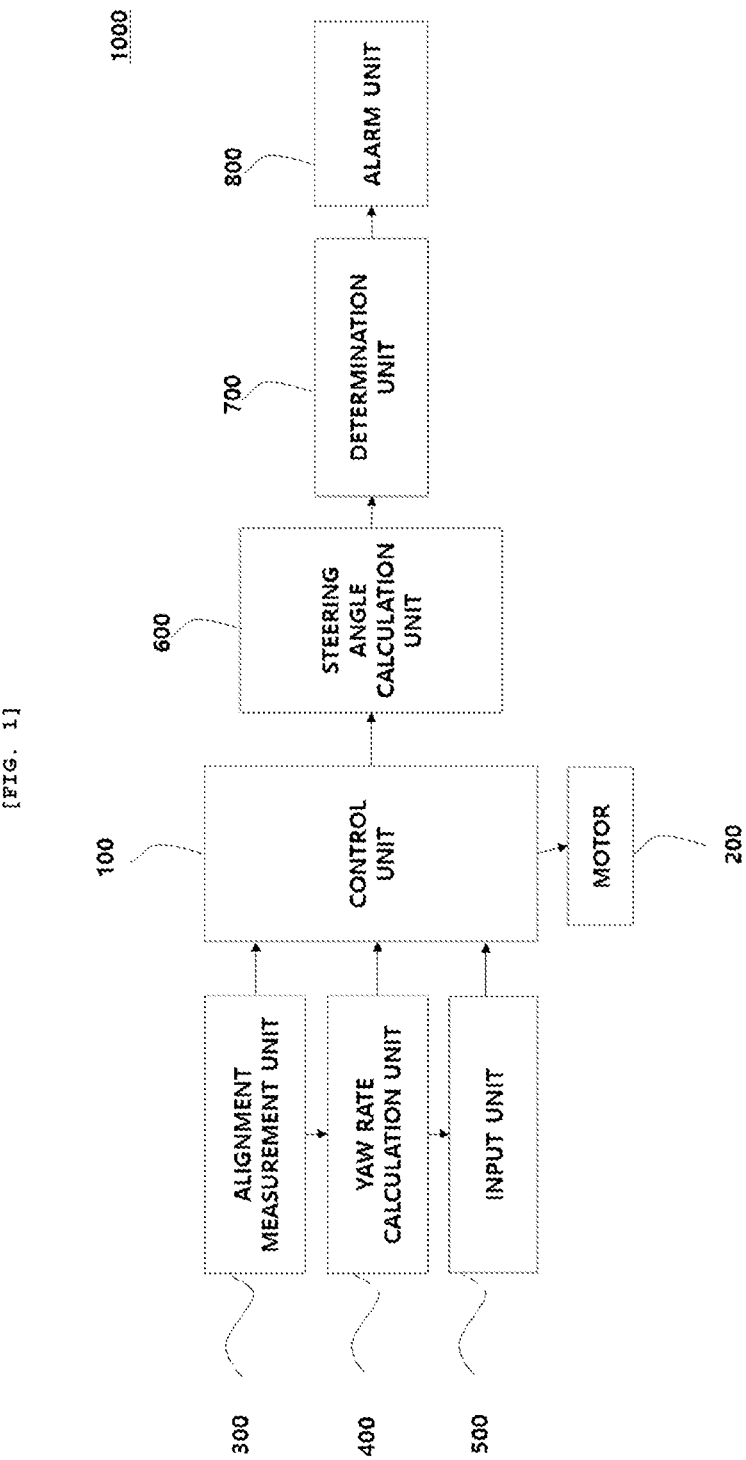

[FIG. 2]
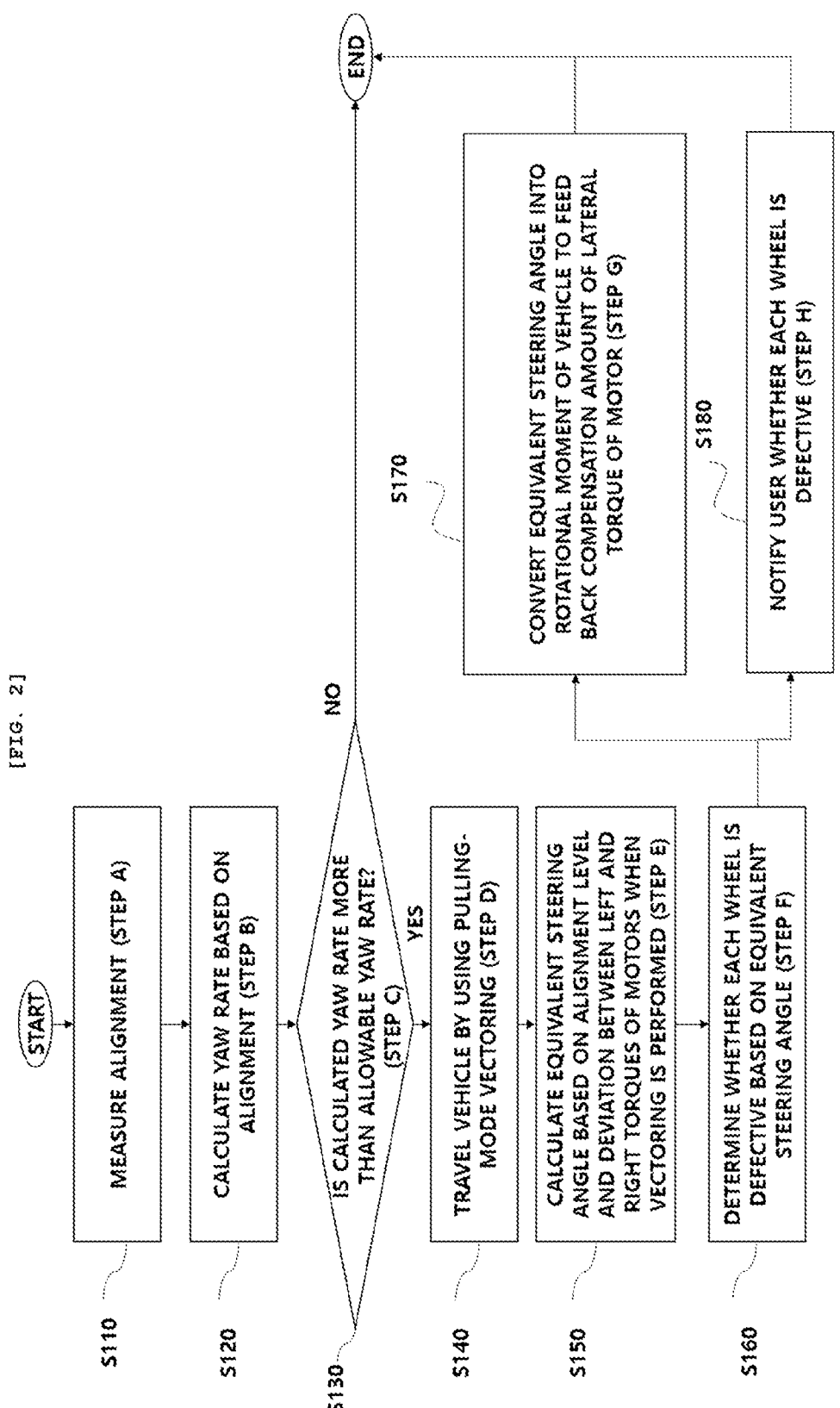

[FIG. 3]
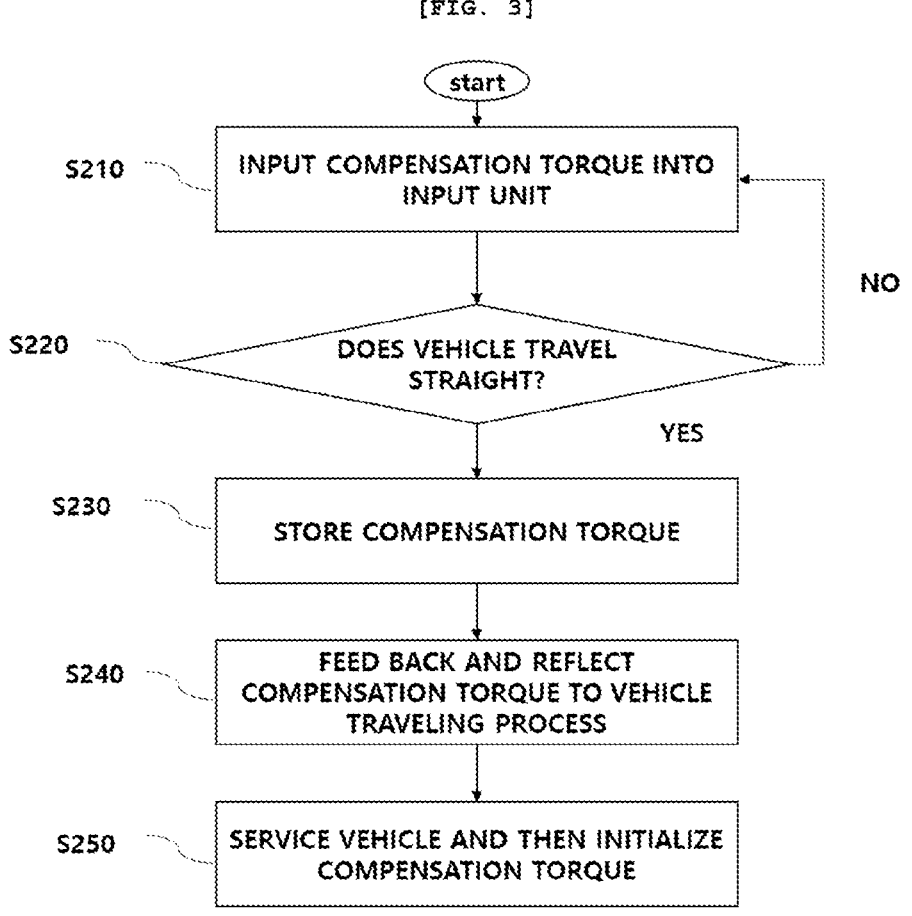

STRAIGHT DRIVING DEVICE OF IN-WHEEL SYSTEM AND CONTROL METHOD USING THE SAME

CROSS-REFERENCE TO RELATED APPLICATIONS

This application claims priority under 35 U.S.C. § 119 to Korean Patent Application No. 10-2023-0004159, filed on Jan. 11, 2023, in the Korean Intellectual Property Office, the disclosure of which is incorporated herein by reference in its entirety.

TECHNICAL FIELD

The following disclosure relates to a control method for straight driving of an in-wheel system using a straight driving device of the in-wheel system.

BACKGROUND

An in-wheel system may be a system in which a motor is installed in a wheel and power of the motor is directly transmitted to the wheel. Accordingly, the respective wheels may be driven independently from each other through a driving force transmitted from each motor. The in-wheel system may be a system having the fastest response from a drive instruction to its response because the motor is installed in the wheel, and may perform an accurate torque measurement to have increased control accuracy. In addition, the system may allow the wheels to be controlled independently from each other, which is advantageous for controlling the turn and slip of a vehicle. Torques required for the respective wheels when the vehicle turns may be controlled to be different from each other to change a yaw rate of the vehicle by using this advantage of the in-wheel system, which is referred to as torque vectoring.

In general, in a vehicle driven by an internal combustion engine as a power source, the driving force generated from the internal combustion engine may be mechanically equally distributed to left and right wheels through a differential gear. Therefore, the vehicle using the differential gear may not need this control to equally distribute the driving force to the left and right wheels. However, the in-wheel system in which the left and right wheels are driven independently from each other may require a control method for preventing the vehicle from being inclined in one direction when the vehicle travels straight. Accordingly, research has been conducted to perform straight traveling of the in-wheel system by detecting an alignment of the vehicle equipped with the in-wheel system and using the torque vectoring.

However, it may be difficult to find a time to service the alignment other than when receiving regular service in a case where the vehicle, such as a shared vehicle or an autonomous vehicle, has no driver.

SUMMARY

An embodiment of the present disclosure is directed to checking and warning whether a vehicle misalignment occurs based on whether a vehicle is inclined by using a function of an in-wheel system to independently control a torque of an in-wheel motor for each wheel of the vehicle.

Another embodiment of f the present disclosure is directed to maintaining straight moving of the vehicle based on a vehicle inclination level by using torque vectoring until the vehicle is serviced when the vehicle misalignment occurs.

Aspects of the present disclosure are not limited to those mentioned above, and other aspects not mentioned here may be obviously understood by those skilled in the art from the following description.

In one general aspect, provided is a control method for straight driving of an in-wheel system. The method includes steps of: a) measuring a vehicle alignment; b) calculating a yaw rate based on a vehicle misalignment level; c) determining whether the yaw rate calculated in the step b) is more than a predetermined allowable yaw rate; d) maintaining straight moving of the vehicle by using vectoring when the yaw rate calculated in the step b) is more than the an predetermined allowable yaw rate; e) calculating equivalent steering angle of each wheel based on the vehicle misalignment level and a deviation between left and right torques of motors that is acquired while the vectoring is performed; and f) determining whether each wheel is defective based on the equivalent steering angle.

The method may further include a step of converting the equivalent steering angle into a rotational moment of the vehicle to feedback a compensation amount of a lateral torque of the motor after the step e).

The method may further include a step of notifying a user that each wheel is defective when each wheel is defective based on the equivalent steering angle after the step f).

The step a) may be performed while the vehicle travels straight by inputting the same torque to the motors of the respective wheels disposed on the vehicle, while the vehicle travels straight by inputting the same torque to the motors of the wheels disposed on the same axis, or inputting the same torque to the motors of the wheels disposed diagonally to each other.

The step d) may include a step of performing coaxial-vectoring straight traveling in which the vehicle travels straight by performing the vectoring through the wheels disposed on the same axis, and a step of performing diagonal-vectoring straight traveling in which the vehicle travels straight by performing the vectoring through the wheels disposed diagonally to each other, wherein the step of coaxial-vectoring straight traveling or the step of diagonal-vectoring straight traveling is made in a sequential order or in a reverse order.

When the vehicle alignment is unable to be measured in the step a), the method may further include: a step of inputting, by a user, a compensation torque to a left or right motor among the motors so that the vehicle travels straight; a step of visually checking, by the user, whether the vehicle travels straight after inputting the compensation torque; and a step of storing the compensation torque when the vehicle travels straight or increasing the compensation torque when the vehicle does not travel straight.

The method may further include a step of feeding back and reflecting the compensation torque to a vehicle traveling process when the vehicle travels straight.

The method may further include a step of servicing the vehicle based on the compensation torque and initializing the compensation torque when the vehicle travels straight.

In another general aspect, provided is a straight driving device of an in-wheel system. The device includes: a motor disposed in each wheel of a vehicle; an alignment measurement unit measuring a vehicle alignment; a yaw rate calculation unit calculating a yaw rate based on a vehicle misalignment level; a control unit controlling the motor to maintain straight moving of the vehicle by using vectoring when the yaw rate calculated by the yaw rate calculation unit is more than a predetermined allowable yaw rate; a steering angle calculation unit calculating an equivalent steering angle of each wheel based on the vehicle misalignment level and a deviation between left and right torques of the motors that is acquired while the vectoring is performed; and a determination unit determining whether each wheel is defective based on the equivalent steering angle.

The steering angle calculation unit may convert the equivalent steering angle into a rotational moment of the vehicle to feed back a compensation amount of a lateral torque of the motor.

The device may further include an alarm device notifying a user that each wheel is defective when each wheel is defective based on the equivalent steering angle.

The alignment measurement unit may measure the alignment while the vehicle travels straight by inputting the same torque to the motors of the respective wheels disposed on the vehicle, while the vehicle travels straight by inputting the same torque to the motors of the wheels disposed on the same axis, or inputting the same torque to the motors of the wheels disposed diagonally to each other.

The equivalent steering angle may be calculated through a process in which the vehicle moves straight by performing the vectoring through the wheels disposed on the same axis, and a process in which the vehicle moves straight by performing the vectoring through the wheels disposed diagonally to each other.

The device may further include an input device allowing a user to input a compensation torque to a left or right motor among the motors of the respective wheels so that the vehicle travels straight when the alignment measurement unit is unable to measure the vehicle alignment, wherein the control unit stores the compensation torque and controls the motor for the vehicle to travel straight based on the compensation torque.

BRIEF DESCRIPTION OF THE DRAWINGS

FIG. 1 shows a straight driving device of an in-wheel system according to an embodiment of the present disclosure.

FIG. 2 shows a control method for straight driving of an in-wheel system according to another embodiment of the present disclosure.

FIG. 3 shows a control method for straight driving of an in-wheel system in another example of the present disclosure.

DETAILED DESCRIPTION OF EMBODIMENTS

Hereinafter, embodiments are described in detail with reference to the accompanying drawings to be easily practiced by those skilled in the art to which the present disclosure pertains. However, the present disclosure may be implemented in various different forms and is not limited to the embodiments described herein. In addition, in the drawings, portions unrelated to the description are omitted to clearly describe the present disclosure, and similar portions are denoted by similar reference numerals throughout the specification.

Throughout the specification, when one part is referred to as being "connected to" another part, one part and another part may be "directly connected to" each other, or may be "electrically connected to" each other with a third part interposed therebetween.

Throughout the specification, when one member is referred to as being positioned "on" another member, one member and another member may be in contact with each other, or a third member may be interposed between one member and another member.

Throughout the specification, "including" one component is to be understood to imply the inclusion of another component rather than the exclusion of another component, unless explicitly described to the contrary. As used throughout the specification, a term of degree "about", "substantially", or the like is used to indicate the number of a stated meaning or its approximation when its manufacturing or material tolerance inherent therein are given. Such a term is used to prevent unscrupulous infringers from unfairly using the present disclosure in which exact or absolute figures are stated to facilitate the understanding of this application. As used throughout the specification, a term of a "step of (doing)" or a "step of~" does not indicate a "step for~".

Hereinafter, the embodiments of the present disclosure are described in detail with reference to the accompanying drawings and the description provided below. However, the present disclosure is not limited to the embodiments described herein, and may also be embodied in another form. The same reference numerals denote the same components throughout the specification.

FIG. 1 shows a straight driving device 1000 of an in-wheel system according to an embodiment of the present disclosure. Referring to FIG. 1, the straight driving device 1000 of an in-wheel system may include a motor 200, an alignment measurement unit 300, a yaw rate calculation unit 400, a control unit 100, a steering angle calculation unit 600, and a determination unit 700, an alarm device 800, and an input device 500.

According to an exemplary embodiment of the present disclosure, the straight driving device 1000 of an in-wheel system may include a processor (e.g., computer, microprocessor, CPU, ASIC, circuitry, logic circuits, etc.) and an associated non-transitory memory storing software instructions which, when executed by the processor, provides the functionalities of the alignment measurement unit 300, the yaw rate calculation unit 400, the control unit 100, the steering angle calculation unit 600, and the determination unit 700. Herein, the memory and the processor may be implemented as separate semiconductor circuits. Alternatively, the memory and the processor may be implemented as a single integrated semiconductor circuit. The processor may embody one or more processor (s).

The motor 200 may be an in-wheel motor. The motor 200 may be individually disposed in each wheel to drive each wheel. Accordingly, if necessary, torques provided to the respective wheels through the motors may be the same as each other or different from each other for the respective wheels.

The alignment measurement unit 300 may measure a vehicle alignment. The yaw rate calculation unit 400 may calculate a yaw rate based on a vehicle misalignment level measured by the alignment measurement unit 300.

The control unit 100 may control the motor 200. The control unit 100 may control the motor 200 to maintain straight moving of a vehicle by using vectoring when the yaw rate calculated by the yaw rate calculation unit 400 is more than a predetermined allowable yaw rate. In an example, the vectoring may be performed by applying the torque in a direction opposite to a direction in which the motor 200 is rotated. The steering angle calculation unit 600 may calculate an equivalent steering angle of each wheel based on the misalignment level and a deviation between left and right torques of the motors 200 that is acquired while the vectoring is performed. The determination unit 700 may determine whether each wheel is defective based on the equivalent steering angle calculated by the steering angle calculation unit 600.

The alarm device 800 may notify a user that each wheel is defective when each wheel is defective based on the equivalent steering angle calculated by the steering angle calculation unit 600. In an example, the alarm device 800 may notify the user whether each wheel is defective by an auditory method, a visual method, a vibration method, or the like.

The input device 500 may allow the user to input a compensation torque to a left or right motor for the vehicle to travel straight when the alignment measurement unit 300 is unable to measure the alignment. The control unit 100 may store the compensation torque and control the motor 200 for the vehicle to travel straight based on the compensation torque.

FIG. 2 shows a control method for straight driving of an in-wheel system according to another embodiment of the present disclosure.

In an example, the control method for straight driving of an in-wheel system may include steps a) to h) (S110 to S180). In the step a) (S110), an alignment measurement unit 300 may measure a vehicle alignment and calculate whether a vehicle travels while being inclined in a direction and its inclination level. In an example, in the measuring of the vehicle alignment in the step a) (S110), the same torque may be applied to each wheel to measure a deviation between steering angles of the respective wheels. An equivalent equation described below may be required for the number of wheels to acquire the deviation between the steering angles of the respective wheels, which may be calculated using a wheel combination for each position.

For example, the step a) step (S110) may be performed while the vehicle travels straight by inputting the same torque to the motors 200 of the respective wheels disposed on the vehicle, while the vehicle travels straight by inputting the same torque to the motors 200 of the wheels disposed on the same axis, or while the vehicle travels straight by inputting the same torque to the motors 200 of the wheels disposed diagonally to each other. If the vehicle has a total of four wheels including two front wheels and two rear wheels, the equivalent equations may be acquired by a total of four traveling combinations while the vehicle travels straight by inputting the same torque to two front motors 200 having the same output, while the vehicle travels straight by inputting the same torque to two rear motors 200, and while the vehicle travels straight by inputting the same torque to two pairs of motors 200 disposed diagonally to each other. The above example exemplifies the four-wheeled vehicle. However, a vehicle misalignment may be checked in the same way through a wheel combination also when an in-wheel is applied to every wheel in addition to the four-wheeled vehicle.

Next, in the step b) (S120), a yaw rate calculation unit 400 may calculate a yaw rate based on the equivalent equation, that is, a misalignment level acquired in the step a) (S110). Next, in the step c) (S130), a control unit 100 may determine whether the yaw rate calculated in the step b) is more than a predetermined allowable yaw rate. Next, in the step d) (S140), the control unit 100 may maintain straight moving of the vehicle by using vectoring when the yaw rate calculated in the step b) is more than the predetermined allowable yaw rate. Maintaining the straight moving of the vehicle by using the vectoring may also be referred to be a pulling mode. That is, in the step d), the vehicle may be switched to the pulling mode when the vehicle yaw rate is more than the predetermined allowable yaw rate.

The vectoring may include a step of performing coaxial-vectoring straight traveling in which the vehicle travels straight by performing the vectoring through the wheels disposed on the same axis, and a step of performing diagonal-vectoring straight traveling in which the vehicle travels straight by performing the vectoring through the wheels disposed diagonally to each other. The step of performing the coaxial-vectoring straight traveling or the step of performing the diagonal-vectoring straight traveling may be made in a sequential order or in a reverse order. While the straight moving of the vehicle is maintained by using the vectoring, the vehicle may travel by having the yaw rate set to zero by left and right motor torques for the vehicle controlled to perform completely straight moving at a steering angle of zero degrees.

Next, in the step e) (S150), a steering angle calculation unit 600 may calculate an equivalent steering angle of each wheel based on the misalignment level and a deviation between the left and right torques of the motors 200 when the vectoring is performed. That is, in the step e) (S150), the equivalent steering angle of each wheel may be calculated by using the vehicle misalignment level acquired in the step a) (S110) and the deviation between the left and right torques of the motors 200 that is acquired in the step d) (S140). The equivalent steering angle may refer to an influence level of a lateral force occurring due to the three-dimensional vehicle misalignment that is expressed as the steering angle at which the same magnitude of lateral force occurs.

After the step e) (S150), the step f) (S160), the step g) (S170), and the step h) (S180) may be performed. The step f) (S160), the step g) (S170), and the step h) (S180) may be simultaneously performed. Alternatively, each step may be performed in a sequential order or in a reverse order.

In the step f) (S160), it may be determined whether each wheel is defective based on the equivalent steering angle. A lateral influence of three elements of the vehicle alignment, i.e., toe, camber, and caster, in the step a) to the step e) (S150), may be referred to as the equivalent steering angle. The straight traveling of the vehicle may also be easily assisted on an inclination inclined to its left and right sides as the lateral influence of the three elements of toe, camber, and caster is referred to as the equivalent steering angle. Whether the wheel is defective may be determined based on the equivalent steering angle, which may be used as a standard for vehicle service.

In the step g) (S170), the equivalent steering angle may be converted into a rotational moment of the vehicle to feed back a compensation amount of a lateral torque of the motor 200. The compensation amount of the lateral torque may be reflected during normal traveling of the vehicle. The compensation amount of the lateral torque of the motor 200 may be provided in a direction and a magnitude to offset the equivalent steering angle. Accordingly, the vehicle may travel while offsetting a vehicle inclination due to an error in the vehicle alignment. Accordingly, the vehicle may travel when the vehicle service is impossible or until immediately before the vehicle service.

In the step h) (S180), an alarm device 800 may notify a user that each wheel is defective when each wheel is defective based on the equivalent steering angle.

FIG. 3 shows a control method for straight driving of an in-wheel system in another example of the present disclosure. The control method for straight driving of an in-wheel system that is shown in FIG. 3 may be performed when the alignment is unable to be measured in the step a) (S110). In this case, the user may manually set the magnitude of the compensation torque through user input. The magnitude of the compensation torque may be gradually increased through the user input, and its value may be stored to be constantly reflected to a traveling state to a level that the vehicle inclination recognized by the driver disappears during his/her normal traveling. Next, the vehicle may be serviced and the compensation torque may then be initialized.

In detail, the control method for straight driving of an in-wheel system may include steps #1 (S210) to #5 (S250). In the step #1 (S210), the user may input the compensation torque to the left or right motor through an input device 500 when determining that the vehicle is misaligned. In the step #2 (S220), the user may determine whether the vehicle travels straight. If the vehicle does not travel straight, the user may increase the compensation torque. In an example, the user may visually determine whether the vehicle travels straight while maintaining a steering wheel in the center. In an example, the compensation torque may be provided as 1 Nm for each input. For example, the right motor may have +1 Nm and the left motor may have –1 Nm when the user inputs + thereto through the input device, and the right motor may have –1 Nm and the left motor may have +1 Nm when the user inputs – thereto through the input device. The compensation torque in a unit of 1 Nm may be cumulatively input by the user when the vehicle does not travel straight.

In the step #3 (S230), the corresponding compensation torque may be stored when the vehicle moves straight based on the user input for the compensation torque. Next, in the step #4 (S240), the compensation torque may be fed back and reflected to a vehicle traveling process. The value of the compensation torque that allows the vehicle to travel straight may be stored, thus allowing the vehicle to travel straight when the vehicle is unable to be serviced or until the vehicle is serviced.

Next, in the step #5 (S250), the vehicle may be serviced based on the compensation torque and the compensation torque may be initialized.

According to the present disclosure, it is possible to expect improved performance of an advanced driver assistance system (ADAS) function in a steering region by quantifying and correcting the vehicle misalignment.

In addition, according to the present disclosure, the vehicle itself may determine whether the vehicle is broken or needs the service, and it is thus possible to expect efficient vehicle management in a field of conducting mass management such as rental vehicles or shared vehicles.

In addition, according to the present disclosure, it is possible to maintain the straight moving and steering feature of the vehicle through a lateral torque distribution even in the situation where the vehicle is misaligned during its travel.

As set forth above, the present disclosure may check and warn whether the vehicle misalignment occurs based on whether the vehicle is inclined by using the function of the in-wheel system to independently control the torque of the in-wheel motor for each wheel of the vehicle.

In addition, the present disclosure may maintain the straight moving of the vehicle based on the vehicle inclination level by using the torque vectoring until the vehicle is serviced when the vehicle misalignment occurs.

Advantageous effects of the present disclosure are not limited to the above-mentioned effects, and effects that are not mentioned are clearly understood by those skilled in the art to which the present disclosure pertains from the specification and the accompanying drawings.

Although the embodiments of the present disclosure are described as above, the embodiments disclosed in the present disclosure are provided not to limit the spirit of the present disclosure but to fully describe the present disclosure. Therefore, the spirit of the present disclosure may include not only each disclosed embodiment but also a combination of the disclosed embodiments. Further, the scope of the present disclosure is not limited to these embodiments. In addition, it is apparent to those skilled in the art to which the present disclosure pertains that various variations and modifications could be made without departing from the sprit and scope of the appended claims, and all such appropriate variations and modifications should be considered as falling within the scope of the present disclosure as equivalents.

What is claimed is:

1. A control method for straight driving of an in-wheel system, the method comprising steps of:
    a) measuring a vehicle alignment to acquire a vehicle misalignment level;
    b) calculating a yaw rate based on the vehicle misalignment level;
    c) determining whether the yaw rate calculated in the step b) is more than a predetermined allowable yaw rate;
    d) maintaining straight moving of the vehicle by using vectoring when the yaw rate calculated in the step b) is more than the predetermined allowable yaw rate;
    e) calculating an equivalent steering angle of each wheel based on the vehicle misalignment level and a deviation between left and right torques of motors that is acquired while the vectoring is performed; and
    f) determining whether each wheel is defective based on the equivalent steering angle.

2. The method of claim 1, further comprising a step of converting the equivalent steering angle into a rotational moment of the vehicle to feedback a compensation amount of a lateral torque of the motor after the step e).

3. The method of claim 1, further comprising a step of notifying a user that each wheel is defective when each wheel is defective based on the equivalent steering angle after the step f).

4. The method of claim 1, wherein the step a) is performed while the vehicle travels straight by inputting the same torque to the motors of the respective wheels disposed on the vehicle, while the vehicle travels straight by inputting the same torque to the motors of the wheels disposed on the same axis, or inputting the same torque to the motors of the wheels disposed diagonally to each other.

5. The method of claim 1, wherein the step d) includes:
    a step of performing coaxial-vectoring straight traveling in which the vehicle travels straight by performing the vectoring through the wheels disposed on the same axis, and
    a step of performing diagonal-vectoring straight traveling in which the vehicle travels straight by performing the vectoring through the wheels disposed diagonally to each other,
    wherein the step of performing coaxial-vectoring straight traveling or the step of performing diagonal-vectoring straight traveling is made in a sequential order or in a reverse order.

6. The method of claim 1, when the vehicle alignment is unable to be measured in the step a), the method further comprising:

a step of inputting, by a user, a compensation torque to a left or right motor among the motors so that the vehicle travels straight;

a step of visually checking, by the user, whether the vehicle travels straight after inputting the compensation torque; and a step of storing the compensation torque when the vehicle travels straight or increasing the compensation torque when the vehicle does not travel straight.

7. The method of claim 6, further comprising a step of feeding back and reflecting the compensation torque to a vehicle traveling process when the vehicle travels straight.

8. The method of claim 6, further comprising a step of servicing the vehicle based on the compensation torque and initializing the compensation torque when the vehicle travels straight.

9. A straight driving device of an in-wheel system, the device comprising:

a motor disposed in each wheel of a vehicle;

an alignment measurement unit measuring a vehicle alignment to acquire a vehicle misalignment level;

a yaw rate calculation unit calculating a yaw rate based on the vehicle misalignment level;

a control unit controlling the motor to maintain straight moving of the vehicle by using vectoring when the yaw rate calculated by the yaw rate calculation unit is more than a predetermined allowable yaw rate;

a steering angle calculation unit calculating an equivalent steering angle of each wheel based on the vehicle misalignment level and a deviation between left and right torques of the motors that is acquired while the vectoring is performed; and a determination unit determining whether each wheel is defective based on the equivalent steering angle.

10

10. The device of claim 9, wherein the steering angle calculation unit converts the equivalent steering angle into a rotational moment of the vehicle to feed back a compensation amount of a lateral torque of the motor.

11. The device of claim 9, further comprising an alarm device notifying a user that each wheel is defective when each wheel is defective based on the equivalent steering angle.

12. The device of claim 9, wherein the alignment measurement unit measures the alignment while the vehicle travels straight by inputting the same torque to the motors of the respective wheels disposed on the vehicle, while the vehicle travels straight by inputting the same torque to the motors of the wheels disposed on the same axis, or inputting the same torque to the motors of the wheels disposed diagonally to each other.

13. The device of claim 9, wherein the equivalent steering angle is calculated through a process in which the vehicle moves straight by performing the vectoring through the wheels disposed on the same axis, and a process in which the vehicle moves straight by performing the vectoring through the wheels disposed diagonally to each other.

14. The device of claim 9, further comprising an input device allowing a user to input a compensation torque to a left or right motor among the motors of the respective wheels so that the vehicle travels straight when the alignment measurement unit is unable to measure the vehicle alignment, wherein the control unit stores the compensation torque and controls the motor for the vehicle to travel straight based on the compensation torque.

* * * * *